(12) United States Patent
Uchikawa et al.

(10) Patent No.: US 7,777,931 B2
(45) Date of Patent: Aug. 17, 2010

(54) ELECTRO-OPTIC ELEMENT AND SCANNING OPTICAL DEVICE

(75) Inventors: Daisuke Uchikawa, Matsumoto (JP); Shigeo Nojima, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 136 days.

(21) Appl. No.: 12/036,811

(22) Filed: Feb. 25, 2008

(65) Prior Publication Data

US 2008/0204851 A1    Aug. 28, 2008

(30) Foreign Application Priority Data

Feb. 26, 2007   (JP) ............................... 2007-045120

(51) Int. Cl.
   *G02F 1/07*   (2006.01)
(52) U.S. Cl. ........................ 359/256; 359/254; 359/255; 359/251
(58) Field of Classification Search ................... 359/256
    See application file for complete search history.

(56) References Cited

U.S. PATENT DOCUMENTS 3,938,878 A * 2/1976 Fox ............................. 359/251
4,614,408 A * 9/1986 Mir et al. ..................... 359/250
4,856,094 A * 8/1989 Heidrich et al. ............. 398/204
5,264,951 A * 11/1993 Takanashi et al. ............. 349/25
RE38,809 E * 10/2005 Yao ............................. 359/256

FOREIGN PATENT DOCUMENTS

JP    A-01-245780    9/1989

* cited by examiner

*Primary Examiner*—Jessica T Stultz
(74) *Attorney, Agent, or Firm*—Oliff & Berridge, PLC (57) ABSTRACT

An electro-optic element includes an electro-optic crystal having a birefringent property, and in which a refractive index distribution is generated in accordance with an intensity of an electric field caused inside, a pair of intensity modulating electrodes for applying a voltage for varying the birefringent property of the electro-optic crystal, a pair of scanning electrodes for applying a voltage for varying the refractive index distribution of the electro-optic crystal, and a polarization selection member provided at least on a side of a laser beam emission end face out of a laser beam entrance end face and the laser beam emission end face of the electro-optic crystal, and for selectively transmitting a part with a specific vibration direction out of a light beam emitted from the electro-optic crystal.

9 Claims, 8 Drawing Sheets

ELECTRO-OPTIC ELEMENT AND SCANNING OPTICAL DEVICE

BACKGROUND

1. Technical Field

The present invention relates to an electro-optic element and a scanning optical device.

2. Related Art

In recent years, a scanning image display device for displaying an image by raster-scanning a light beam such as a laser beam on an irradiated surface has been proposed. In this device, high contrast display is possible in comparison with a projector or the like using, for example, a liquid crystal light valve because complete black color can be displayed by stopping supply of the laser beam. Further, since an image display device using a laser beam has characteristics such that the single-wavelength laser beam causes high color purity, and that the high coherence thereof makes the shaping (aperturing) of the beam easy, the image display device using the laser beam is expected to be a high-quality display achieving a high resolution and high color reproducibility. Further, since the scanning image display device does not have any fixed pixels unlike with a liquid crystal display, a plasma display, and so on, the scanning image display device does not have a concept of the number of pixels, and consequently, has an advantage that the resolution can easily be converted.

In order for generating an image by the scanning image display device, it is necessary to scan a light beam two-dimensionally using a scanner such as a polygon mirror or a galvanometer mirror. Although a method of scanning the light beam two-dimensionally by swinging a single scanner in two directions, namely a horizontal direction and a vertical direction can be considered, in such a case, there arises a problem that the structure and control of the scanning system become complicated. Therefore, there has been proposed a scanning image display device provided with two sets of scanners each for scanning a light beam one-dimensionally and arranged to have charges of horizontal scanning and vertical scanning, respectively. In the past, it has been common to use polygon mirrors or galvanometer mirrors for both of the scanners, and a projection device using rotating polygon mirrors for both of the scanners is disclosed in JP-A-1-245780.

However, although in the above document the device using the polygon mirrors is introduced, the scanning frequency increases with increase in resolution of the image format, and approaches the limit with polygon mirrors or galvanometer mirrors. Therefore, in recent years, a system applying the microelectromechanical systems (MEMS) technology to the higher-speed scanner has been introduced. A scanner (hereinafter simply referred to as a HEMS scanner) applying the MEMS technology denotes a scanner manufactured using a fine processing technology of a semiconductor material such as silicon, in which a mirror supported by a torsion spring and so on is driven with electrostatic force. This scanner can scan a light beam by reciprocating the mirror with the interaction of the electrostatic force and the restoring force of the spring. By using the MEMS scanner, a high-frequency scanner with a large deflection angle in comparison with past scanners can be realized. Thus, it becomes possible to display a high-resolution image.

Incidentally, since the reciprocating motion of the mirror at the resonance frequency is required for realizing a high-speed MEMS scanner, in consideration of efficiency of a light beam, there is adopted a system in which a scanning line is formed from left to right viewed from the viewer, and then the next scanning line is formed from right to left (bi-directional scanning).

On the other hand, since the image signal is standardized based on cathode ray tubes (CRT), the format thereof corresponds to scanning (unidirectional scanning) in which the scanning point moves from left to right, then returns to left in a short period of time, and moves to right again. Therefore, in the case with the MEMS scanner, regarding a part of the data, the order of the signals needs to be reversed when displaying the data, and consequently, the control of the signals becomes complicated.

Consequently, as a scanning method other than the MEMS scanner, there can be cited an electro-optic (EO) scanner. The EO scanner is an element in which the proceeding direction of a light beam transmitted through an EO crystal is changed by applying a voltage to the EO crystal. As described above, since in the EO scanner the scanning angle can be controlled by the voltage, drawing with the unidirectional scanning becomes possible similarly to the CRT.

Further, in the EO scanner, electrons are injected in the EO crystal by applying the voltage thereto, thus unevenness is generated in the electron distribution. Therefore, the distribution is generated in the refractive index alteration caused by a Kerr effect to deflect the incident light beam towards the side with a higher refractive index, thus making the scanning of the light beam possible. Further, since the gradient of the refractive index distribution inside the EO crystal depends on the amount of the injected electrons, namely the applied voltage, by varying the applied voltage, the scanning angle of the light beam emitted from the EO crystal can be controlled.

Incidentally, in a display device using the EO scanner, it is necessary to modulate the intensity at positions corresponding to respective pixels in order for displaying the image. In the case in which Super Video Graphics Array (SVGA) class display is performed, the modulation rate higher than about 30 MHz is necessary. However, depending on the type of the laser source, there arises a problem that the sufficient modulation rate can hardly be obtained. Further, although it is also possible to provide an external modulator using an electro-optic element or an acousto-optic element separately from the EO scanner, there arises a problem that increase in the number of elements incurs rise in cost, and further, requires an additional volume resulting in growth in size.

SUMMARY

An advantage of some aspects of the present invention is to provide an electro-optic element and a scanning optical device which are each high-speed and capable of obtaining a large deflection angle, and at the timer compact and moderate in cost.

In order for obtaining the above advantage, the invention provides the following measures.

An electro-optic element according to an aspect of the invention includes an electro-optic crystal having a birefringent property, and in which a refractive index distribution is generated in accordance with an intensity of an electric field caused inside, a pair of intensity modulating electrodes for applying a voltage for varying the birefringent property of the electro-optic crystal, a pair of scanning electrodes for applying a voltage for varying the refractive index distribution of the electro-optic crystal, and a polarization selection member provided at least on a side of a laser beam emission end face out of a laser beam entrance end face and the laser beam emission end face of the electro-optic crystal, and for selectively transmitting a part with a specific vibration direction out of a light beam emitted from the electro-optic crystal.

In the electro-optic element according to an aspect of the invention, voltages are applied to the intensity modulating electrodes and the scanning electrodes. Thus, since the birefringent property is caused in an area of the electro-optic crystal to which the voltage is applied by the intensity modulating electrodes, the light beam entering this area is rotated in the polarization plane in accordance with the value of the voltage applied thereto. Further, in an area of the electro-optic crystal to which the voltage is applied by the scanning electrodes, the refractive index distribution of the electro-optic crystal increases or decreases continuously along one direction in accordance with the electric field caused inside. Therefore, the laser beam proceeding in a direction perpendicular to the electric field caused inside the electro-optic crystal is deflected from the side with a low refractive index towards the side with a high refractive index. Further, a part with the specific vibration direction of the light beam emitted from the electro-optic crystal is transmitted by the polarization selection member provided to the emission end face of the electro-optic crystal, in accordance with the polarization plane thereof. As described above, the light beam entering the electro-optic crystal is modulated and then emitted.

Therefore, by providing the intensity modulating electrodes and the scanning electrodes to the electro-optic crystal, it becomes possible to modulate the intensity of the incident light beam and to scan the incident light beam with a single electro-optic crystal. Therefore, even in the case in which a light beam emitted from a light source device which cannot provide sufficient modulation rate of the light beam such as a light source with a wavelength conversion element is input, it becomes possible to increase the modulation rate by controlling the voltage applied to the intensity modulating electrodes of the electro-optic crystal.

Specifically, the modulation equivalent to an external modulator using an acousto-optic element becomes possible, and it becomes possible to obtain the high speed electro-optic element with a large deflection angle. Further, since the modulation rate is raised using the electro-optic crystal for scanning the light beam as an additional usage instead of raising the modulation rate using a separate optical member, it becomes possible to provide the compact electro-optic element with moderate cost.

Further, in the electro-optic element according to this aspect of the invention, it is preferable that the electro-optic crystal is composed of a modulating area held between the intensity modulating electrodes and a scanning area held between the scanning electrodes sequentially disposed from the laser beam entrance end face along a proceeding direction of the laser beam.

In the electro-optic element according to this aspect of the invention, the light beam input from the entrance end face of the electro-optic crystal is firstly modulated in the modulating area. Then, the modulated light beam is input to the scanning area, and is scanned. On this occasion, the light beam entering the scanning area is input in a direction perpendicular to the entrance end face of the scanning area. In contrast to this aspect of the invention, if the scanning area and the modulating area are sequentially disposed, since the light beam emitted from the scanning area is input to the modulating area from an oblique direction, there arises a concern that the light beam proceeding in the modulating area is not rotated to have the predetermined polarization plane. Therefore, by providing the modulating area and the scanning area in this order as in this aspect of the invention, it becomes possible to more accurately scan and modulate the light beam entering the electro-optic crystal.

Further, in the electro-optic element according to this aspect of the invention, it is preferable that the intensity modulating electrodes and the scanning electrodes are different in material from each other.

In the electro-optic element according to this aspect of the invention, since the intensity modulating electrodes and the scanning electrodes are different in material from each other, the both characteristics of the birefringent property and the refractive index distribution can surely be brought out in the electro-optic crystal. Therefore, both of the intensity modulation and the deflection of the light beam entering the electro-optic crystal can surely be performed.

Further, in the electro-optic element according to this aspect of the invention, it is preferable that the electro-optic crystal includes a component of $KTa_{1-x}Nb_xO_3$.

In the electro-optic element according to this aspect of the invention, the electro-optic crystal is a crystal (hereinafter referred to as a KTN crystal) having a component of $KTa_{1-x}Nb_xO_3$ (potassium tantalate niobate), which is a dielectric material with a high permittivity. The KTN crystal has a property of changing the crystal system from a cubical crystal to a tetragonal crystal, and further to a rhombohedral in accordance to the temperature, and it is known that it has a large second-order electro-optic effect in the cubical crystal. In particular, in an area close to the phase transition temperature from the cubical crystal to the tetragonal crystal, there occurs a phenomenon that the relative permittivity diverges, and the second-order electro-optic effect proportional to the square of the relative permittivity becomes an extremely large value. Therefore, the crystal with the component of $KTa_{1-x}Nb_xO_3$ can suppress the applied voltage necessary for varying the refractive index to a lower value compared to other crystals. Thus, the electro-optic element capable of achieving low power consumption can be provided.

A scanning optical device according to another aspect of the invention includes a light source device for emitting a laser beam, and the electro-optic element described above for modulating the laser beam emitted from the light source device in accordance with an image signal, and scanning the laser beam towards an irradiated surface.

In the scanning optical device according to this aspect of the invention, the laser beam emitted from the light source device is modulated in accordance with the image signal, and scanned towards the irradiated surface by the electro-optic element. On this occasion, as described above, by using the electro-optic element capable of performing the intensity modulation, and having a large deflection angle, a scanning optical device using a scanning device capable of accepting high resolution can be obtained. Therefore, the scanning optical device capable of achieving downsizing of the whole device, and displaying an image more clearly on the irradiated surface without causing deterioration of the image quality can be obtained.

Further, in the scanning optical device according to this aspect of the invention, it is preferable that the light source device emits a plurality of laser beams with wavelengths different from each other, and the polarization selection member selectively transmits a part with a specific vibration direction out of the laser beam in a specific wavelength range out of wavelength ranges of the plurality of laser beams, and transmits the laser beams outside the specific wavelength range irrespective of vibration directions.

In the scanning optical device according to this aspect of the invention, as the polarization selection member, for example, what functions on the wavelength range of the light beam having a low modulation rate is used. As described above, since the polarization selection member functions on the wavelength range of the light beam having a low modulation rate, when the laser beam emitted from the electro-optic crystal is transmitted through the polarization selection member, only the light beam with low modulation rate should be modulated. Therefore, since the modulation rates of a plurality of laser beams with different wavelengths can be adjusted to be the same, it becomes possible to project a clear image on the irradiated surface.

Further, in the scanning optical device according to this aspect of the invention, it is preferable that the light source device emits a plurality of laser beams with wavelengths different from each other, the plurality of laser beams is respectively input to different areas of the electro-optic crystal, and the pair of intensity modulating electrodes is separately provided to each of the different areas.

In the scanning optical device according to this aspect of the invention, the laser beams with different wavelengths emitted from the light source device are respectively input to the different areas of the electro-optic crystal. Further, since the intensity modulating electrodes are separately provided to each of the different areas, it becomes possible to vary the amount of modulation for every laser beam by controlling the voltages applied to the respective intensity modulating electrodes. Therefore, even in the case in which all of the modulation rates of the plurality of laser beams are insufficient for performing an appropriate display, high speed modulations necessary for appropriate display and different from each other can be respectively executed on the plurality of laser beams. Therefore, it becomes possible to project a clear image on the irradiated surface.

Further, in the scanning optical device according to this aspect of the invention, it is preferable that the light source device emits a plurality of laser beams with wavelengths different from each other, and there is provided a control section for controlling driving of the light source device so that the plurality of laser beams is scanned in a time sequential manner in a drawing period for one frame.

Further, in the scanning optical device according to this aspect of the invention, it is preferable that the light source device emits a plurality of laser beams with wavelengths different from each other, and there is provided a control section for controlling driving of the light source device so that the plurality of laser beams is scanned in a time sequential manner in a drawing period for one line.

In the scanning optical device according to this aspect of the invention, since the laser beams with different wavelengths can be scanned sequentially by one frame or by one line by the control section controlling driving of the light source device, the laser beams with different wavelengths can be input to the same area of the electro-optic crystal. Therefore, since the intensity modulating electrodes provided for each of the laser beams with different wavelengths are not required, downsizing and moderate manufacturing cost can be achieved.

Further, in the case in which the laser beams with different wavelengths are scanned every frame, each laser beam is irradiated for a longer period of time compared to the case of scanning the laser beams every line, the driving control of the light source devices by the control section becomes simple. Further, since the color shift caused by a drawing method does not occur, a clear image can be projected on the irradiated surface.

Further, in the case in which the laser beams with different wavelengths are scanned every line, the repeating frequency of the color becomes higher compared to the case of scanning the laser beams with different wavelengths every frame, thus occurrence of the color break-up can be suppressed. Further, since the driving speed of the slower scanning device, namely the vertical scanning rate of the irradiated surface, can be lowered compared to the case of scanning the laser beams with different wavelengths every frame, the slow scanning device can also be adopted, thus cost reduction is possible.

Further, in the scanning optical device according to this aspect of the invention, it is preferable that the electro-optic element performs horizontal scanning.

In the scanning optical device according to this aspect of the invention, the electro-optic element performs the horizontal scanning, and an inexpensive polygon mirror, for example, is used as the vertical scanner, thus an inexpensive and high performance scanning optical device can be realized.

It should be noted that "horizontal scanning" here denotes a faster scanning out of two directional scanning, and "vertical scanning" denotes a slower scanning.

BRIEF DESCRIPTION OF THE DRAWINGS

The invention will now be described with reference to the accompanying drawings, wherein like numbers refer to like elements.

DESCRIPTION OF EXEMPLARY EMBODIMENTS

Hereinafter, some embodiments of an electro-optic element and a scanning optical device according to the invention will be explained with reference to the accompanying drawings. It should be noted that the scale size of each member is accordingly altered so that the member is shown large enough to be recognized in the drawings below.

First Embodiment

Figure 1:
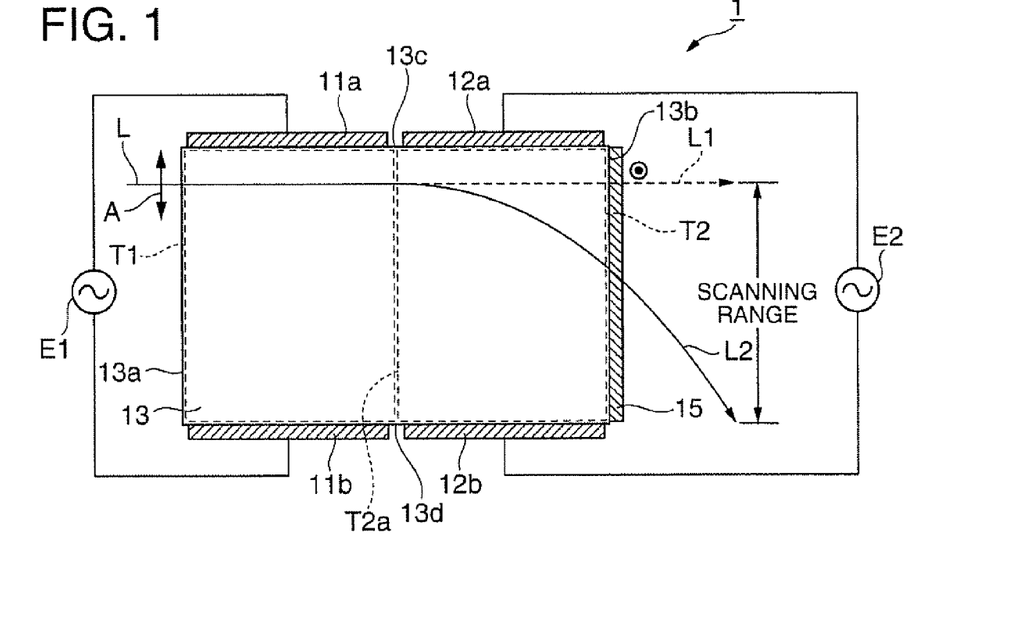
FIG. 1 is a cross-sectional view showing a substantial part of an electro-optic element according to a first embodiment of the invention.

An electro-optic element 1 has both functions of modulating an incident light beam with a birefringent property, and of scanning a laser beam proceeding through the inside thereof by varying the refractive index distribution in accordance with the intensity of the electric field caused in the inside thereof. Specifically, as shown in FIG. 1, the electro-optic element 1 is provided with a pair of intensity modulating electrodes 11a, 11b, a pair of scanning electrodes 12a, 12b, and an optical element (an electro-optic crystal) 13. Further, the intensity modulating electrodes 11a, 11b are disposed across the optical element 13 from each other. Similarly, the scanning electrodes 12a, 12b are also disposed across the optical element 13 from each other.

Further, the laser beam vibrating in an arranging direction of the intensity modulating electrodes 11a, 11b as illustrated by the arrow A in FIG. 1 enters the electro-optic element 1.

The optical element 13 is a dielectric crystal (an electro-optic crystal) having an electro-optic effect, and is made of a crystalline material including a composition of KTN ($KTa_{1-x}Nb_xO_3$, potassium tantalate niobate) in the present embodiment. Further, the optical element 13 has a cuboid shape, and is provided with a polarization plate (a polarization selection member) 15 so as to have contact with an emission end face 13b thereof opposite to an entrance end face 13a thereof.

The polarization plate 15 is made of inorganic materials, and is a wire grid polarization plate with wires (thin wires) made of metal such as aluminum formed as stripes on a substrate such as glass. Further, the polarization plate 15 has a configuration for transmitting a polarized light beam with a polarization direction substantially perpendicular to the extending direction of the wires while reflecting a polarized light beam with a polarization direction substantially perpendicular to the above polarization direction.

Further, the polarization direction (transmission axis) of the polarization plate 15 is arranged to be a direction (a specific vibration direction) perpendicular to the polarization direction of an incident laser beam. Thus, a black display is performed in the state in which no voltage is applied between the intensity modulating electrodes 11a, 11b (normally black display).

Further, as shown in FIG. 1, the intensity modulating electrodes 11a, 11b are respectively disposed on one surface 13c and the other surface 13d opposite to the one surface 13c of the optical element 13. Further, the scanning electrodes 12a, 12b are also disposed respectively on the one surface 13c and the other surface 13d of the optical element 13, similarly to the intensity modulating electrodes 11a, 11b.

Each of the intensity modulating electrode 11a and the scanning electrode 12a on the one surface 13c of the optical element 13 is disposed in an area obtained by dividing the one surface 13c into two substantially equal parts. Similarly, each of the intensity modulating electrode 11b and the scanning electrode 12b on the other surface 13d of the optical element 13 is disposed in an area obtained by dividing the other surface 13d into two substantially equal parts.

Further, the intensity modulating electrode 11a and the scanning electrode 12a disposed on the one surface 13c of the optical element 13 are arranged adjacent to each other with a predetermined distance towards the proceeding direction of the laser beam. Specifically, the intensity modulating electrode 11a is disposed on the side of the entrance end face 13a of the one surface 13c of the optical element 13, and the scanning electrode 12a is disposed on the side of the emission end face 13b of the one surface 13c.

Further, also on the other surface 13d of the optical element 13, similar to the one surface 13c, there are disposed the intensity modulating electrode 11b on the side of the entrance end face 13a of the optical element 13, and the scanning end face 12b on the side of the emission end face 13b thereof.

Thus, the optical element 13 has a configuration in which a modulating area T1, namely the area held between the intensity modulating electrodes 11a, 11b, and a scanning area T2, namely the area held between the scanning electrodes 12a, 12b, are disposed in sequence.

Firstly, the intensity modulating electrodes 11a, 11b will be explained.

As a material of the intensity modulating electrodes 11a, 11b, a material inducing a Kerr effect inside the optical element 13 is selected. In the present embodiment, as the electrode material of the intensity modulating electrodes 11a, 11b, an electrode material with a large Schottky barrier such as Pt is used. It should be noted that Pt is nothing more than an example.

Further, a power supply E1 is connected to the intensity modulating electrodes 11a, 11b for applying a voltage therebetween. Further, the intensity modulating electrodes 11a, 11b have the same dimensions in the proceeding direction of the laser beam L proceeding inside the optical element 13.

Then, the scanning electrodes 12a, 12b will be explained.

As a material of the scanning electrodes 12a, 12b, a material for inducing, inside the optical element 13, an effect (a space charge control mode electro-optic effect) that the refractive index distribution is controlled by a space charge as shown in FIG. 1 is selected. In the present embodiment, as the electrode material for the scanning electrodes 12a, 12b, Ti with which an electric current is easily injected in the optical element 13 is used. It should be noted that the electrode material of the scanning electrodes 12a, 12b is not limited to Ti, but can be any materials capable of having an ohmic contact with the optical element 13 and exerting an effect of reducing the Schottky barrier.

Further, a power supply E2 is connected to the scanning electrodes 12a, 12b for applying a voltage therebetween. Further, the scanning electrodes 12a, 12b have the same dimensions in the proceeding direction of the laser beam L proceeding inside the optical element 13. As described above, it is arranged that voltages can be applied independently to the intensity modulating electrodes 11a, 11b and the scanning electrodes 12a, 12b by the power supplies E1, E2.

Then, the light beam entering the modulating area T1 will be explained.

Since a voltage is applied to the modulating area T1 by the electrode material Pt with a large Schottky barrier, the laser beam entering the area is dominantly influenced by the Kerr effect. Thus, the plane of polarization is rotated in accordance with the voltage value applied between the intensity modulating electrodes 11a, 11b.

Figure 2:
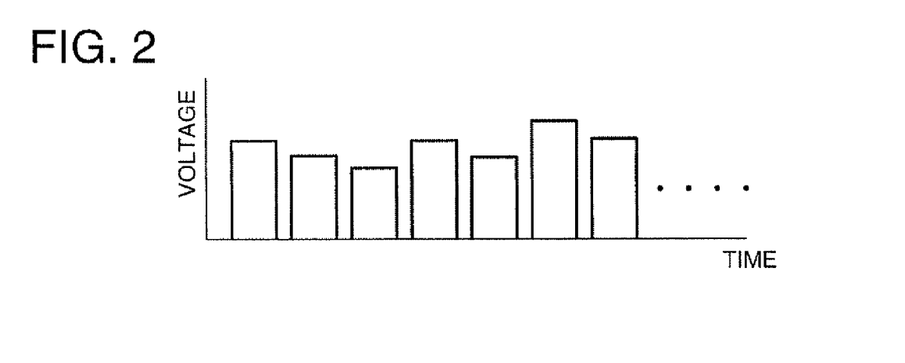
FIG. 2 is a diagram showing a voltage signal applied to intensity modulating electrodes shown in FIG. 1.

Specifically, such a pulse signal with a voltage value corresponding to the light intensity as shown in FIG. 2 is applied between the intensity modulating electrodes 11a, 11b by the power supply E1. Thus, the laser beam entering the modulating area T1 enters an entrance end face T2a of the scanning area T2 with the polarization plane rotated in accordance with the voltage value of the pulse signal. The laser beam entering the scanning area T2 is emitted from the polarization plate 15 provided to the emission end face 13b of the optical element 13 with the polarization plane maintained in the scanning area T2. On this occasion, the component of the incident light beam different from the transmission axis of the polarization plate 15 is reflected by the polarization plate 15 while the light beam with the same component as the transmission axis is transmitted through the polarization plate 15 and emitted therefrom. In this way, the intensity modulation of the light beam entering the optical element 13 is performed.

Then, the light beam entering the scanning area T2 will be explained.

The incident laser beam to the scanning area T2 is dominantly influenced by the space charge control mode electro-optic effect, and consequently, refracted in accordance with the intensity of the electric field generated in the scanning area T2 in accordance with the value of the voltage applied between the scanning electrodes 12a, 12b.

Figure 3:
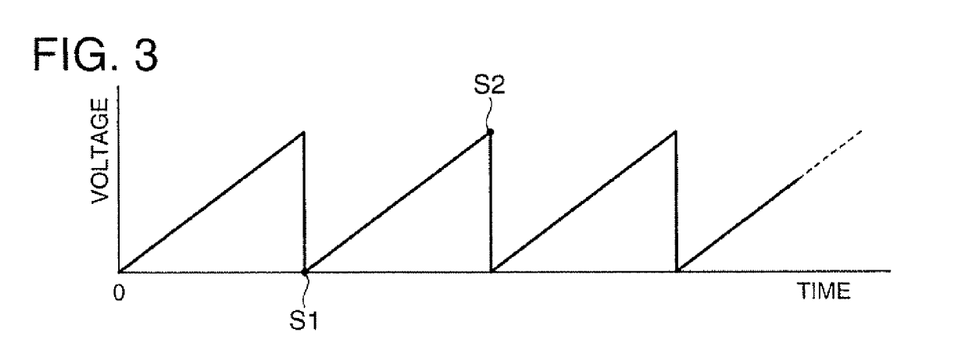
FIG. 3 is a diagram showing a voltage signal applied to scanning electrodes shown in FIG. 1.

Such a voltage with a saw-tooth waveform as shown in FIG. 3 is applied between the scanning electrodes 12a, 12b by the power supply E2. It should be noted that the voltage of the scanning electrode 12b is fixed to 0V.

When the voltage with an initial value S1 to be applied to the scanning electrode 12a is applied to the scanning electrode 12a, the laser beam L1 proceeding inside the optical element 13 proceeds straight as shown in FIG. 1. Further, when the voltage value to be applied to the scanning electrode 12a is gradually raised as illustrated as the voltage waveform shown in FIG. 3, the refractive index gradient of the optical element increases, and the laser beam is emitted with a deflection angle corresponding to the voltage value. Further, when the maximum voltage value S2 is applied to the scanning electrode 12a, the laser beam L2 proceeding in the optical element 13 is significantly deflected in the optical element 13 and emitted therefrom as shown in FIG. 1.

As described above, it is arranged that by applying the voltage with the waveform shown in FIG. 3 to the scanning electrode 12a, the laser beam L emitted from the modulating area T1 is scanned in the scanning range from the laser beam L1 to the laser beam L2 by the scanning area T2 as shown in FIG. 1. Specifically, the light beam entering from the entrance end face 13a of the optical element 13 proceeds straight in the modulating area T1 with the polarization plane rotated to a predetermined polarization plane, then enters the scanning area T2, and is deflected towards the scanning electrode 12b. Then, the laser beam deflected in the scanning area T2 is transmitted through the polarization plate 15 in accordance with the polarization plane, and then emitted therefrom.

Further, since in the present embodiment, the laser beam is scanned only in one direction, the laser beam is input from the entrance end face 13a of the optical element 13 on the side of the one surface 13c as shown in FIG. 1. In other words, since in the present embodiment, the laser beam entering the optical element 13 is deflected towards the other surface 13d by the refractive index distribution of the optical element 13, by inputting the laser beam on the side of the one surface 13c of the optical element 13, a wide scanning range can be obtained.

According to the electro-optic element 1 according to the present embodiment, by providing the intensity modulating electrodes 11a, 11b and the scanning electrodes 12a, 12b to the optical element 13, it becomes possible to modulate the intensity of the incident laser beam and to scan the incident laser beam with a single optical element 13. Therefore, even if a light beam emitted from a light source, which cannot achieve a sufficient modulation rate of the light beam, is input, the modulation rate can be increased by controlling the voltage applied to the intensity modulating electrodes 11a, 11b of the optical element 13.

Specifically, the modulation (several hundreds of megahertz or more) equivalent to an external modulator using an acousto-optic element is possible, and it becomes possible to obtain the high speed electro-optic element 1 with a large deflection angle. Further, since the modulation rate is raised using the optical element 13 for scanning the light beam instead of raising the modulation rate using a separate optical member, it becomes possible to provide the compact electro-optic element 1 with moderate cost.

In other words, the electro-optic element 1 according to the present embodiment can obtain a large deflection angle at high speed, and also can be made compact with moderate cost.

Further, since the wire grid polarization plate is used as the polarization plate 15, a polarization-changing optical element vastly superior in heat resistance to dielectric multilayer films and hardly causing light absorption can be obtained. Specifically, since the incident angle dependency of the light beam entering the polarization splitting surface can be reduced, the light beam can be transmitted or reflected by the reflective surface without decreasing the amount of light emitted from the light source, thus the efficiency of light can be improved.

Further, although the optical element 13 is arranged to have a configuration of having the modulating area T1 and the scanning area T2 disposed in sequence from the entrance end face 13a along the proceeding direction of the laser beam, the optical element having the scanning area T2 and the modulating area T1 disposed in this order can also be adopted.

However, since in the present embodiment, the incident light beam is rotated to have a predetermined polarization plane in the modulating area T1, and then scanned in the scanning area T2, it becomes possible to input the laser beam from a direction perpendicular to the entrance end face T2a of the scanning area T2. Thus, the incident light beam to the optical element 13 can more accurately be modulated compared to the case (the case with the order of scanning area T2 and then the modulating area T1) in which the laser beam enters from an oblique direction with respect to the entrance end face T1a of the modulating area T1.

Further, in the case of using the external modulator, an alignment between the external modulator and the scanning device provided separately is necessary. In contrast, in the electro-optic element 1 of the present embodiment, such an alignment is not required, and consequently, the assembly thereof becomes easy.

Further, since the black display is performed in the state in which no voltage is applied between the intensity modulating electrodes 11a, 11b (normally black display), even if a laser beam is continuously input to the electro-optic element 1 by chance in the state in which no voltage is applied to the electro-optic element 1, it becomes possible to surely prevent the light beam from being emitted to the outside from the electro-optic element 1.

It should be noted that although the configuration of disposing the polarization plate 15 so as to have contact with the emission end face 13b of the optical element 13 is adopted, it is also possible to dispose the polarization plate 15 at a position distant therefrom and where the light beam emitted from the emission end face 13b can enter the polarization plate 15.

Further, although in the case in which the light beam to be input to the electro-optic element 1 has a predetermined polarization direction, the polarization plate 15 does not need to be used with the entrance end face 13a of the optical element 13 as described above, in the case in which a higher extinction ratio (contrast) is required, it is desirable to provide the polarization plate also on the side of the entrance end face 13a.

Further, although the wire grid polarization plate is used as the polarization plate 15, the polarization plate 15 is not limited thereto. For example, although the polarization plate 15 made of inorganic materials is used, a polarization plate made of organic materials can also be used.

Further, although such a polarization plate as to reflect the component not conforming to the transmission axis is adopted, such a polarization plate as to absorb the component not conforming to the transmission axis can also be adopted.

Further, although as the laser beam to be input to the optical element 13, the laser beam vibrating in an arranging direction of the intensity modulating electrodes 11a, 11b is used, the direction is not limited thereto. Further, it is possible to use a polarization plate having a transmission axis corresponding to the polarization direction of the laser beam entering the optical element 13 as the polarization plate 15.

Figure 4:
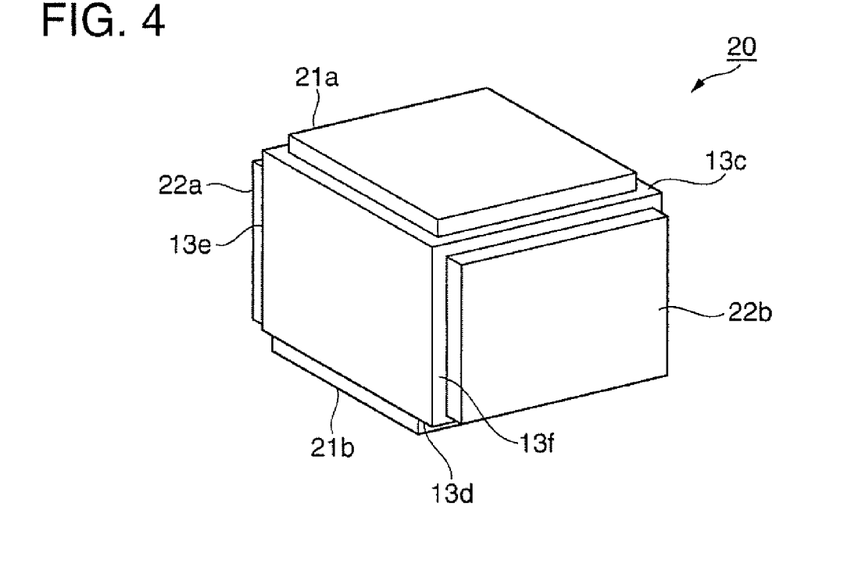
FIG. 4 is a perspective view showing a modified example of the electro-optic element according to the first embodiment of the invention.

Further, although the modulating area T1 and the scanning area T2 are separately provided in one optical element 13, an electro-optic element 20 having the modulating area T1 and the scanning area T2 overlapping each other can also be adopted. Specifically, as shown in FIG. 4, the electro-optic element 20 is provided with intensity modulating electrodes 21a, 21b respectively on the one surface 13c and the other surface 13d of the optical element 13 opposed to each other, and with scanning electrodes 22a, 22b respectively on surfaces 13e, 13f opposed to each other in a direction perpendicular to the one surface 13c of the optical element 13. Thus, the intensity modulation and the scanning of the incident laser beam can be performed in the same area.

In the present configuration, since the modulating area T1 and the scanning area T2 are realized in the same area to reduce the element length of the optical element 13, it becomes possible to achieve downsizing and cost reduction. Further, since the emission time of the laser beam from entrance to emission in the optical element 13 is shortened by reducing the element length of the optical element 13, the scanning speed of the light beam emitted from the optical element 13 can be increased.

Further, although each of the intensity modulating electrode 11a and the scanning electrode 12a is disposed in the area obtained by dividing the optical element 13 into two substantially equal parts, but this is not a limitation.

Further, although the electro-optic element 1 scans the laser beam only in one direction, bi-directional scanning in which the incident light beam to the optical element 13 is scanned towards the both sides centering around the incident light beam can also be adopted.

Second Embodiment

A second embodiment according to the invention will now be explained with reference to FIG. 5.

In the present embodiment, an image display device (scanning optical device) 30 equipped with the electro-optic element 1 of the first embodiment described above as a scanning device will be explained.

It should be noted that in the embodiments described hereinafter, portions having configurations common to the electro-optic element 1 according to the first embodiment will be denoted with the same reference numerals, and the explanations therefor will be omitted.

Figure 5:
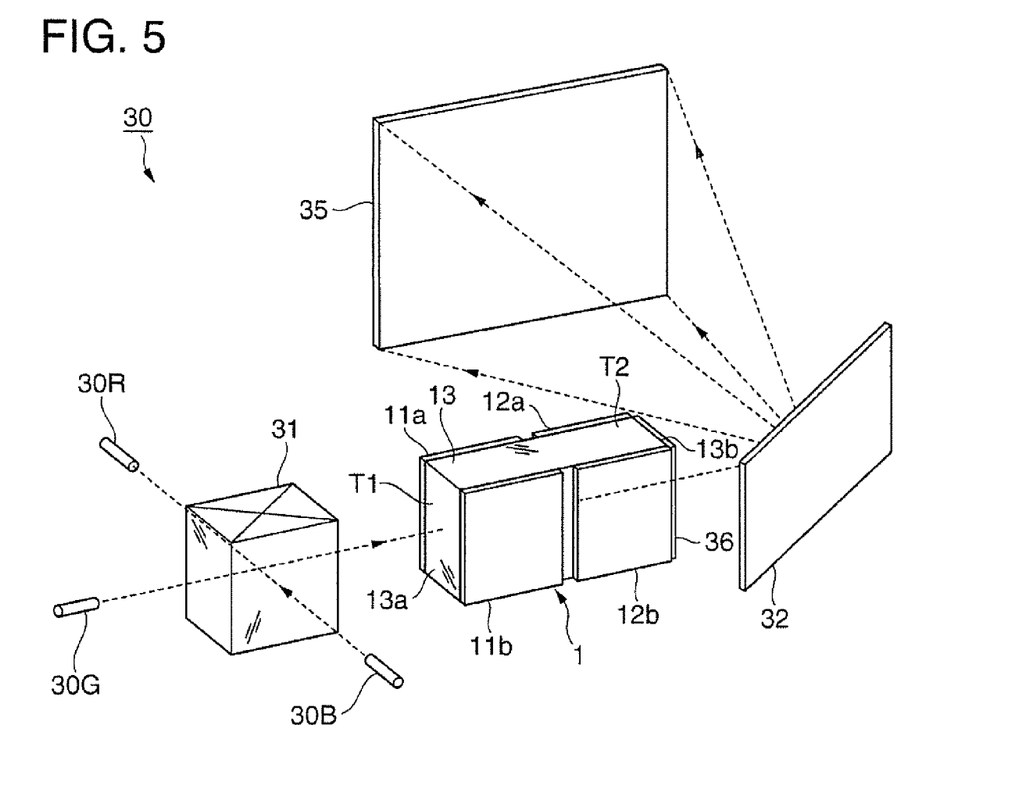
FIG. 5 is a perspective view showing a scanning optical device according to a second embodiment of the invention.

As shown in FIG. 5, the image display device 30 according to the present embodiment is provided with a red light source device (a light source device) 30R for emitting red laser beam with a center wavelength of 630 nm, a green light source device (a light source device) 30G for emitting green laser beam with a center wavelength of 530 nm, a blue light source device (a light source device) 30B for emitting blue laser beam with a center wavelength of 450 nm, a cross dichroic prism 31, the electro-optic element 1 for scanning the laser beam emitted from the cross dichroic prism (a color composition section) 31 in a horizontal direction of a screen (an irradiated surface) 35, a galvanometer mirror 32 for scanning the laser beam emitted from the electro-optic element 1 in a vertical direction of the screen 35, and the screen 35 on which the laser beam scanned by the galvanometer mirror 32 is projected.

Further, the green light source 30G is formed of a Diode Pumped Solid State (DPSS) laser including a semiconductor laser (LD) and a wavelength conversion element, wherein the laser beam emitted by the semiconductor laser is converted into the green laser beam with a center wavelength of 530 nm by the wavelength conversion element.

A polarization plate (a polarization selection member) 36 used in the present embodiment functions on the light beam in the wavelength range of the green laser beam, namely the wavelength range of 490 nm through 570 nm. Specifically, the polarization plate 36 has a configuration of transmitting a polarized light beam with a specific polarization direction out of the green laser beam, and reflecting a polarized light beam with a polarization direction substantially perpendicular to the specific polarization direction. Thus, since the polarization plate 36 does not function on the light beam outside the wavelength range of 490 nm through 570 nm, the red laser beam and the blue laser beam are transmitted without being modulated.

A method of projecting an image on the screen 35 using the image display device 30 according to the present embodiment thus configured will now be explained.

The laser beams emitted from the light source devices 30R, 30G, and 30B are combined by the cross dichroic prism 31, and enter the electro-optic element 1. All of the polarization planes of the colored light beams, namely the red, green, and blue laser beams, entering the optical element 13 are rotated in the modulating area T1 in accordance with a voltage applied between the intensity modulating electrodes 11a, 11b. Further, the light beam entering from the modulating area T1 to the scanning area T2 is scanned in the horizontal direction of the screen 35, and scanned in the vertical direction thereof by the galvanometer mirror 32, thus projected on the screen 35.

On this occasion, all of the polarization plane of the colored light beams, namely the red, green, and blue laser beams are rotated by transmitted through the modulating area T1, and when transmitted through the polarization plate 36 of the electro-optic element 1, a component not conforming to the polarization direction of the polarization plate 36 is reflected while the light beam with a component conforming to the polarization direction is transmitted through the polarization plate 36 to be emitted therefrom with respect only to the green laser beam. In this way, the intensity modulation of the green laser beam entering the optical element 13 is performed.

Further, regarding the red and blue laser beams, the intensity modulation is performed by controlling the current or the voltage applied to the light source devices 30R, 30B.

In the image display device 30 according to the present embodiment, since the wavelength conversion element is used in the green light source device 30G, the modulation rate of the green light source device 30G is lower than the modulation rates of the red light source device 30R and the blue light source device 30B. However, since the polarization plate 36 functions on the light beam in the wavelength range of the green laser beam, only the green laser beam is modulated out of the laser beams emitted from the optical element 13. Therefore, by controlling the voltage applied between the intensity modulation electrodes 11a, 11b, the modulation rate of the green laser beam can be increased. Thus, since the modulation rates of the light source devices 30R, 30G, and 30B for emitting a plurality of laser beams with different wavelengths can be made equal to each other, it is possible to irradiate the same area with the same timing. Therefore, it becomes possible to project a clear image on the screen 35.

Further, in the image display device 30 according to the present embodiment, since the electro-optic element 1 with a large deflection angle is used as the scanning device, the display device can correspond to the Super Video Graphics Array (SVGA) class resolution. Therefore, an image can more clearly be displayed on the screen while achieving low power consumption without causing deterioration in image quality.

Moreover, since the scanning device formed of the electro-optic element 1 can perform scanning faster than the MEMS scanners, by using the electro-optic scanner for the horizontal scanning and the galvanometer mirror 32 (a movable scanning device for reflecting light while moving) for the vertical scanning with a lot of flexibility as in the present embodiment, it can be expected to realize a high performance image display device. It should be noted that the scanning can be performed by a polygon mirror, which is moderate in price, and one of movable scanning devices, instead of the galvanometer mirror 32. By using the inexpensive polygon mirror, a high performance image display can be performed with moderate cost.

Third Embodiment

A third embodiment according to the invention will now be explained with reference to FIGS. 6 through 9.

Figure 6:
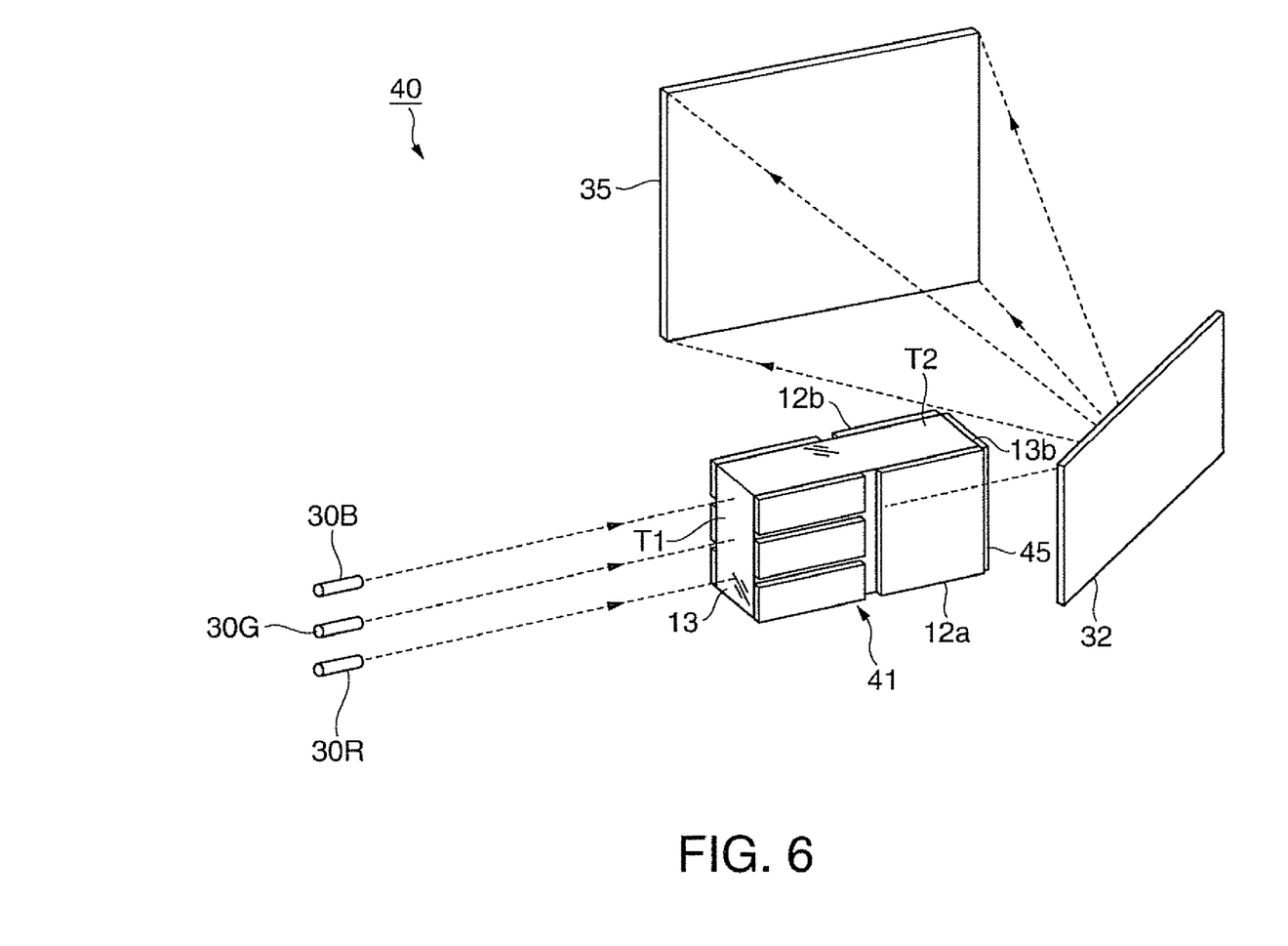
FIG. 6 is a perspective view showing a scanning optical device according to a third embodiment of the invention.

An image display device 40 according to the present embodiment is different from the image display device of the second embodiment in the configuration of the electro-optic element 41.

Specifically, although in the second embodiment, only the modulation rate of the green light source device 30G is controlled, the image display device 40 of the present third embodiment is provided with an electro-optic element 41 capable of controlling the modulation of all of the red laser beam, green laser beam, and blue laser beam respectively emitted from the red light source device 30R, green light source device 30G, and blue light source device 30B.

As shown in FIG. 6, the electro-optic element 41 is provided with a polarization plate (a polarization selection member) 45 so as to have contact with the emission end face 13b of the optical element 13. The polarization plate 45 functions on the light beams in the entire wavelength range including the wavelength range of the red laser beam, the wavelength range of the green laser beam, and the wavelength range of the blue laser beam.

Figure 7:
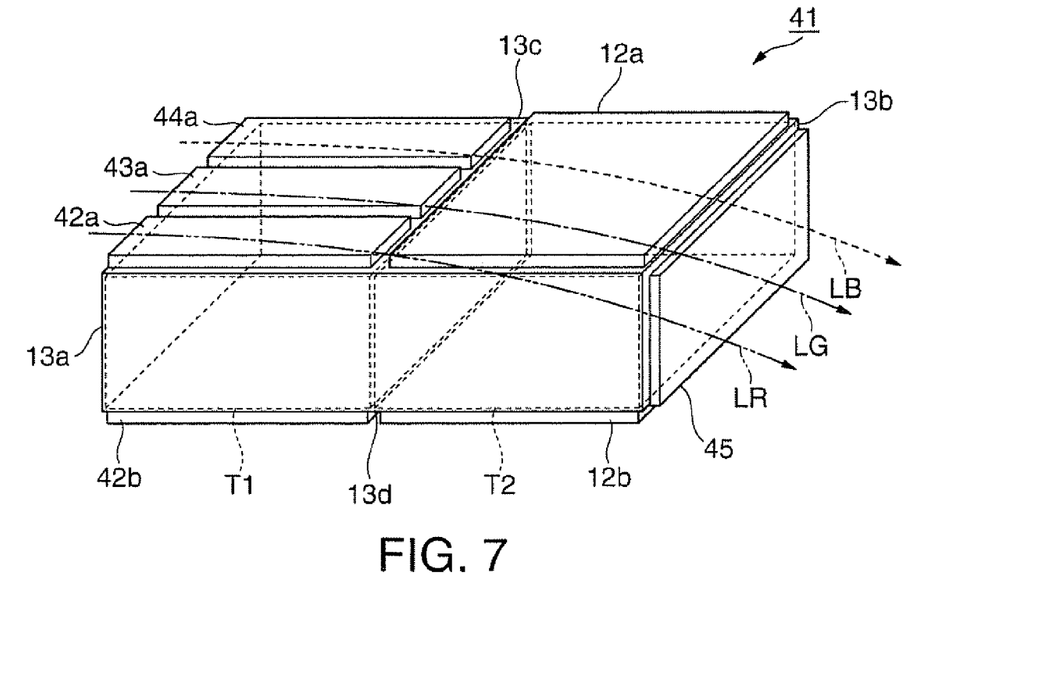
FIG. 7 is a perspective view showing an electro-optic element shown in FIG. 6.
Figure 8:
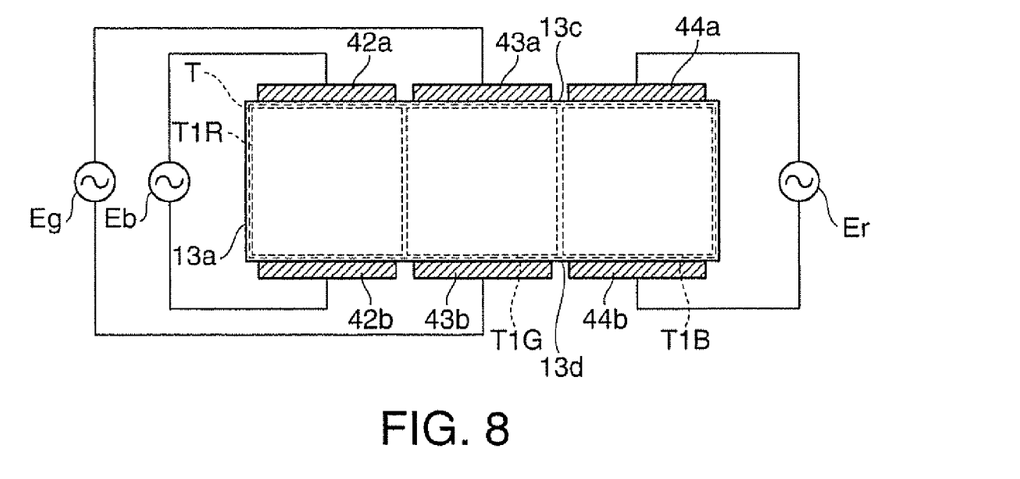
FIG. 8 is a cross-sectional view showing a substantial part of the electro-optic element shown in FIG. 6.

As shown in FIG. 7, the electro-optic element 41 is composed of the modulating area T1 and the scanning area T2. Further, as shown in FIG. 8, the modulating area T1 is composed of a red modulating area T1R, a green modulating area T1G, and a blue modulating area T1B obtained by dividing the modulating area T1 into three substantially equal parts along the width direction of the optical element 13. It should be noted that the scanning area T2 has the same configuration as in the second embodiment.

Further, the red modulating area T1R is an area held between a red intensity modulating electrode 42a provided on the one surface 13c and a red intensity modulating electrode 42b provided on the other surface 13d. It is arranged that the red laser beam LR emitted from the red light source device 30R enters this area T1R. Similarly, the green modulating area T1G is an area held between green intensity modulating electrodes 43a, 43b, and arranged so that the green laser beam LG is input thereto, and the blue modulating area T1B is an area held between blue intensity modulating electrodes 44a, 44b, and arranged so that the blue laser beam LB is input thereto. The electrode material of all of these intensity modulating electrodes 42a, 42b, 43a, 43b, 44a, and 44b is Pt.

Further, as shown in FIG. 8, a power supply Er is provided between the red intensity modulating electrodes 42a, 42b, and similarly, a power supply Eg is provided between the green intensity modulating electrodes 43a, 43b, and a power supply Eb is provided between the blue intensity modulating electrodes 44a, 44b. Further, pulse signals with voltage values corresponding to the light beam intensities are applied between the electrodes 42a, 42b, the electrodes 43a, 43b, and the electrodes 44a, 44b by the power supplies Er, Eg, and Eb, respectively.

Thus, as shown in FIG. 7, the laser beams LR, LG, and LB input to the respective modulating areas T1R, T1G, and T1B enter the scanning area T2 with the polarization planes rotated in accordance with the voltage values of the pulse signals, respectively. Further, by applying a voltage between the scanning electrodes 12a, 12b by the power supply E2 in the scanning area T2, the red, green, and blue laser beams LR, LG, and LB entering the scanning area T2 from the respective modulating areas T1R, T1G, and T1B are deflected towards the scanning electrode 12b influenced by the same electric field inside the optical element 13. Further, the red, green, and blue laser beams LR, LG, and LB thus deflected in the scanning area T2 are transmitted through the polarization plate 45 in accordance with the polarization planes of the respective laser beams, and emitted therefrom.

Figure 9:
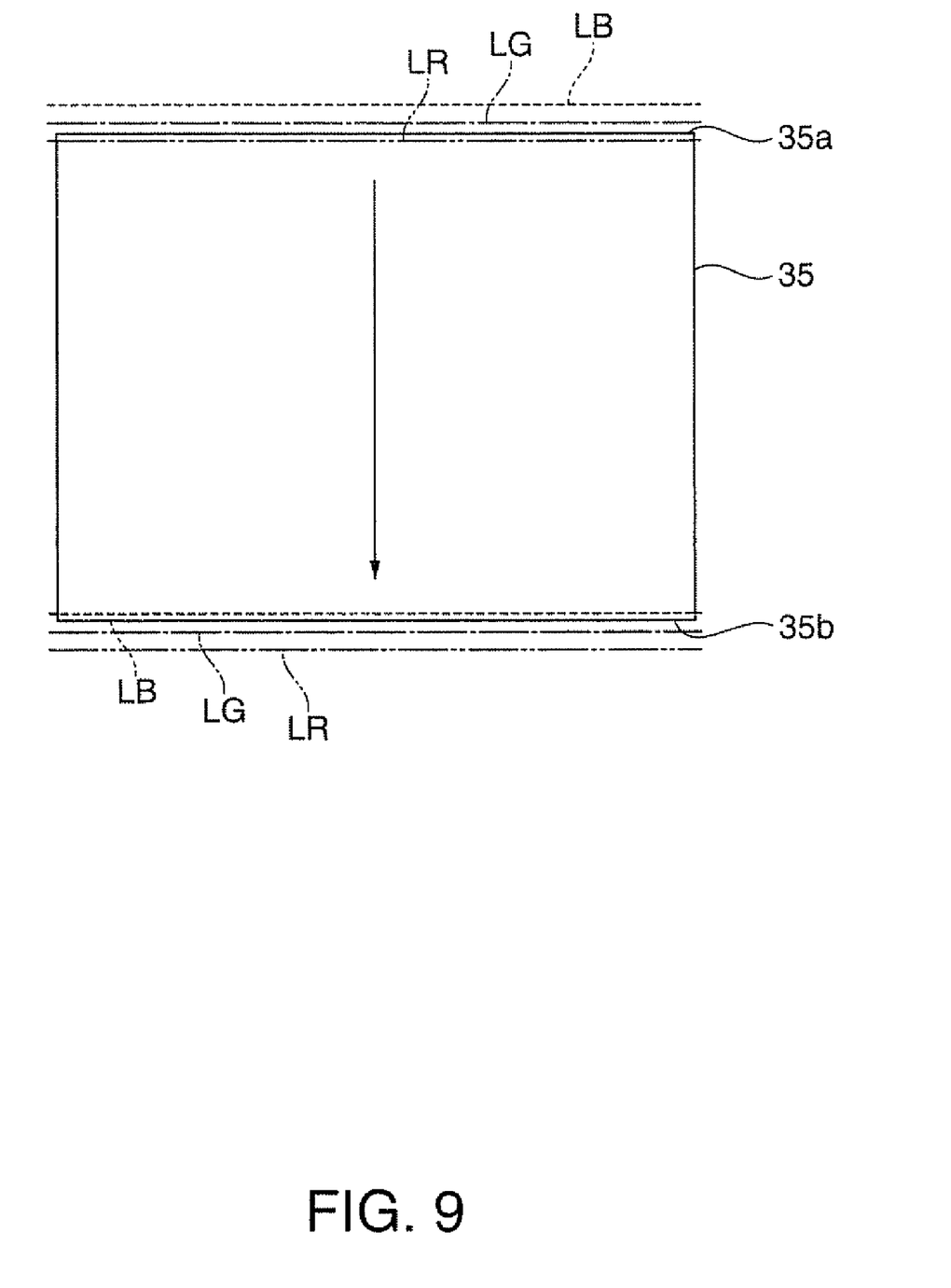
FIG. 9 is a schematic diagram showing a laser beam projected to an irradiated surface of the scanning optical device according to the third embodiment of the invention.

FIG. 9 shows the red, green, and blue laser beams LR, LG, and LB scanned on the screen 35.

As shown in FIG. 9, the red, green, and blue laser beams emitted from the electro-optic element 41 simultaneously form three scanning lines respectively corresponding to the blue laser beam LB, the green laser beam LG, and the red laser beam LR sequentially from the upper end 35a to the lower end 35b of the screen 35. On this occasion, in the first horizontal scanning, since the blue laser beam LB and the green laser beam LG scan above (outside the screen 35) the upper end 35a of the screen 35, the blue light source device 30B and the green light source device 30G are kept out. Then, the green light source device 30G is put on from, for example, the second horizontal scanning, and the blue light source device 30B is put on from, for example, the third horizontal scanning.

Further, since the red laser beam LR scans below (outside the screen 35) the lower end 35b of the screen 35 from, for example, the second last horizontal scanning, the red light source device 30R is put out, and since the green laser beam LG scans below (outside the screen 35) the lower end 35b of the screen 35 in the last horizontal scanning, the green light source device 30G is put out.

In the image display device 40 according to the present embodiment, since the red, green, and blue laser beams respectively emitted from the red, green, and blue light source devices 30R, 30G, and 30B are input to the red, green, and blue modulating areas T1R, T1G, and T1B different from each other of the optical element 13, it becomes possible to modulate the laser beams separately from each other. Thus, by controlling the voltages applied between the intensity modulating electrodes 42a, 42b, between the intensity modulating electrodes 43a, 43b, and between the intensity modulating electrodes 44a, 44b, respectively, the amount of modulation can be varied for each of the laser beams. Therefore, even in the case in which the modulation rates of the laser beams emitted from the red, green, and blue light source devices 30R, 30G, and 30B are not sufficient for the appropriate display, a sufficiently high modulation rate can be obtained for each of the light beams in one element, and further, the modulations different from each other can be executed on the respective light beams. Therefore, it becomes possible to project a clear image on the screen 35.

Fourth Embodiment

A fourth embodiment according to the invention will now be explained with reference to FIGS. 10 and 11.

In the image display device 40 of the third embodiment, the laser beams are input to the respective areas in order for controlling the modulation rates of all of the red, green, and blue laser beams. An image display device 50 according to the present fourth embodiment is different from the image display device 40 according to the third embodiment in that the red, green, and blue laser beams are input to the same modulating area T1 to control the modulation rates of the red, green, and blue laser beams. Further, as the electro-optic element, the electro-optic element 1 used in the first embodiment is used. It should be noted that the polarization plate 15 provided to the emission end face 13b of the electro-optic element 1 functions on the light beams in the entire wavelength range including the wavelength range of the red laser beam, the wavelength range of the green laser beam, and the wavelength range of the blue laser beam.

Figure 10:
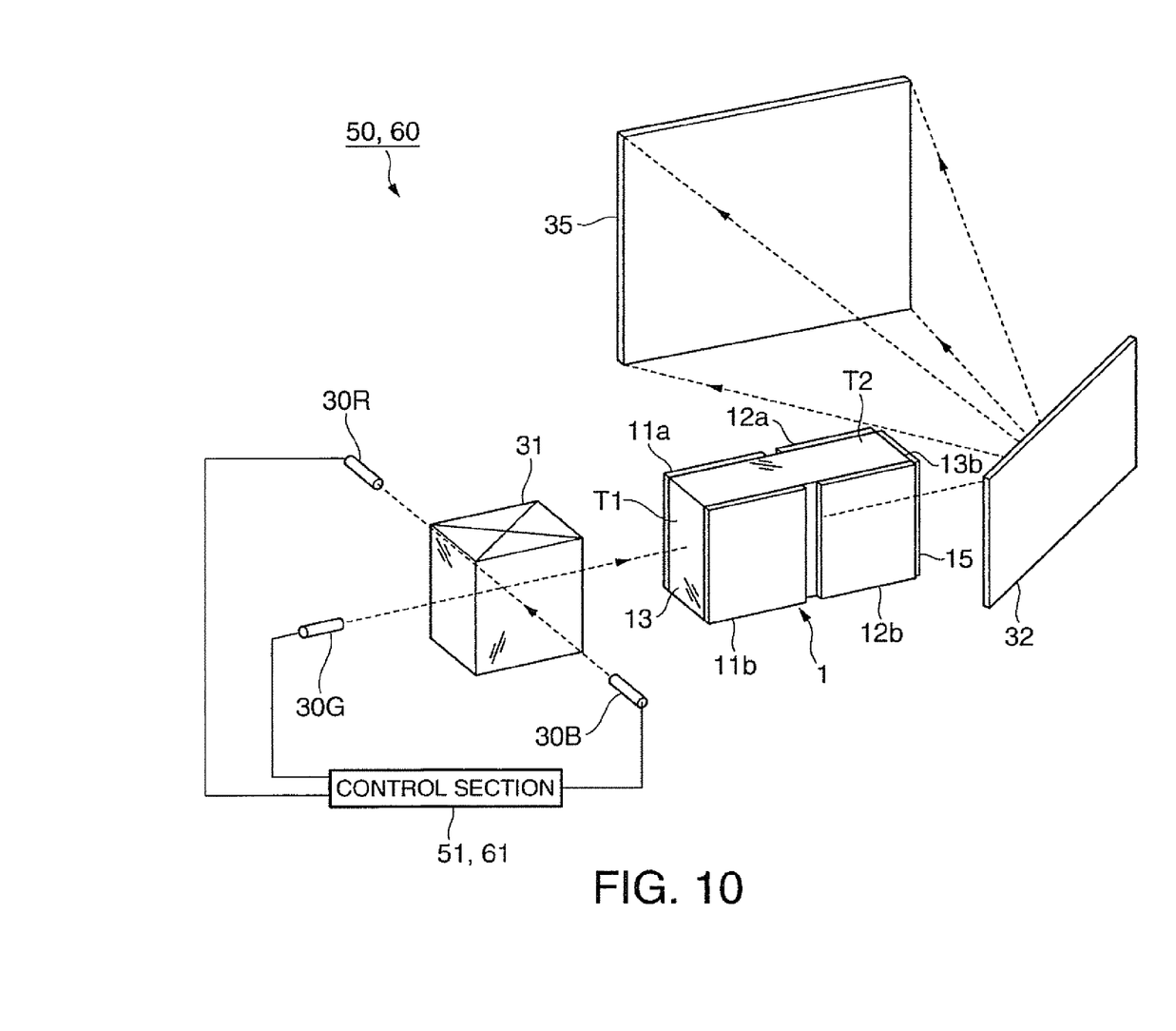
FIG. 10 is a perspective view showing a scanning optical device according to a fourth embodiment of the invention.

As shown in FIG. 10, the image display device 50 is provided with a control section 51 for controlling driving of the red, green, and blue light source devices 30R, 30G, and 30B.

Figure 11:
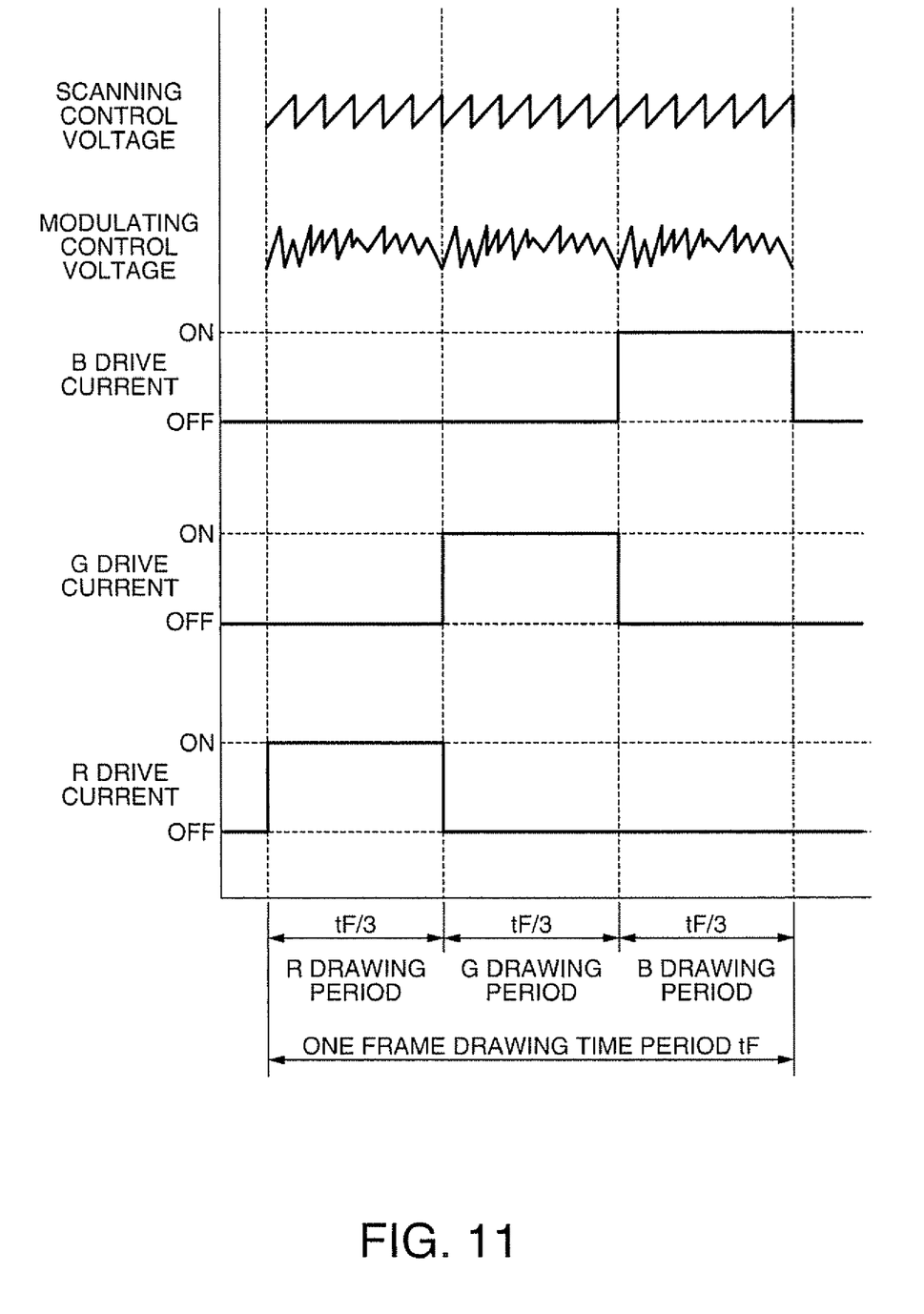
FIG. 11 is a timing chart of driving of a light source device and a voltage applied to an electro-optic element in the scanning optical device according to the fourth embodiment of the invention.

The control section 51 performs the color sequential drive on the red light source device 30R, the green light source device 30G, and the blue light source device 30B in this order so that the red laser beam, the green laser beam, and the blue laser beam are sequentially emitted in every frame (a period of time for drawing one color image) as shown in a timing chart of FIG. 11.

In the case in which a frame of three-color image is drawn with the red, green, and blue laser beams in a time period of tF, a drawing period of each laser beam every frame makes tF/3. Further, since each laser beam is modulated in the modulating area T1, only the ON/OFF control is required for each of the light source devices 30R, 30G, and 30B.

Firstly, the red light source device 30R is made operate by the control section 51, and one frame of image is drawn with the red laser beam emitted from the red light source device 30R. Specifically, the red laser beam is rotated to have a predetermined polarization plane in the modulating area T1, and then input to the scanning area T2 to be deflected towards the scanning electrode 12b. Then, the laser beam deflected in the scanning area T2 is transmitted through the polarization plate 15 in accordance with the polarization plane, and then emitted therefrom. Further, during a period when the drawing by the red light source device 30R proceeds, the control section 51 controls the green light source device 30G and the blue light source device 30B to keep an OFF state.

After the drawing has been performed by the red light source device 30R, the green light source device 30G is made operate by the control section 51, and the drawing of the one frame of image with the green laser beam is performed similarly to the case with the red laser beam. Further, during a period when the drawing by the green light source device 30G proceeds, the control section 51 controls the red light source device 30R and the blue light source device 30B to keep an OFF state.

Then, after the drawing has been performed by the green light source device 30G, the blue light source device 30B is made operate by the control section 51, and the drawing of the one frame of image with the blue laser beam is performed similarly to the case with the red laser beam. Further, during a period when the drawing by the blue light source device 30B proceeds, the control section 51 controls the red light source device 30R and the green light source device 30G to keep an OFF state.

As described above, the one frame of image of each of the colored light beams is formed with each of the red, green, and blue laser beams, and a full-color image is formed by overlapping these images on a human eye.

Further, as shown in FIG. 11, the voltage waveform to be applied to the scanning electrodes 12a, 12b is the same as the waveform shown in FIG. 3. Further, as shown in FIG. 11, the voltage signal corresponding to the light intensity is applied to the intensity modulating electrodes 11a, 11b.

In the image display device 50 according to the present embodiment, since the red, green, and blue laser beams are scanned in a time-sequential manner in the drawing period for one frame by the control section 51, these laser beams can be input to the same modulating area T1 of the optical element 13. Therefore, since the intensity modulating electrodes provided for each of the laser beams with different wavelengths as in the image display device 40 according to the third embodiment are not required, downsizing and moderate manufacturing cost can be achieved.

Further, since the laser beams with different wavelengths are scanned every frame, each laser beam is irradiated for a longer period of time compared to the case of scanning the laser beams every line, the driving control of the light source devices 30R, 30G, and 30B by the control section 51 becomes simple. Further, since the color shift caused by a drawing method does not occur, a clear image can be projected on the screen 35.

Fifth Embodiment

A fifth embodiment according to the invention will now be explained with reference to FIGS. 10 and 12.

In the image display device 50 according to the fourth embodiment described above, the control section 51 controls the light source devices 30R, 30G, and 30B to scan the red, green, and blue laser beams every frame. In the image display device 60 according to the fifth embodiment, the control section 61 controls the light source devices 30R, 30G, and 30B so as to scan the red, green, and blue laser beams every line (a line in the horizontal direction composing a color image).

It should be noted that the schematic overall configuration diagram of the image display device 60 of the present embodiment is the same as that of the image display device 50 according to the fourth embodiment.

As shown in FIG. 10, the image display device 60 is provided with a control section 61 for controlling driving of the red, green, and blue light source devices 30R, 30G, and 30B.

Figure 12:
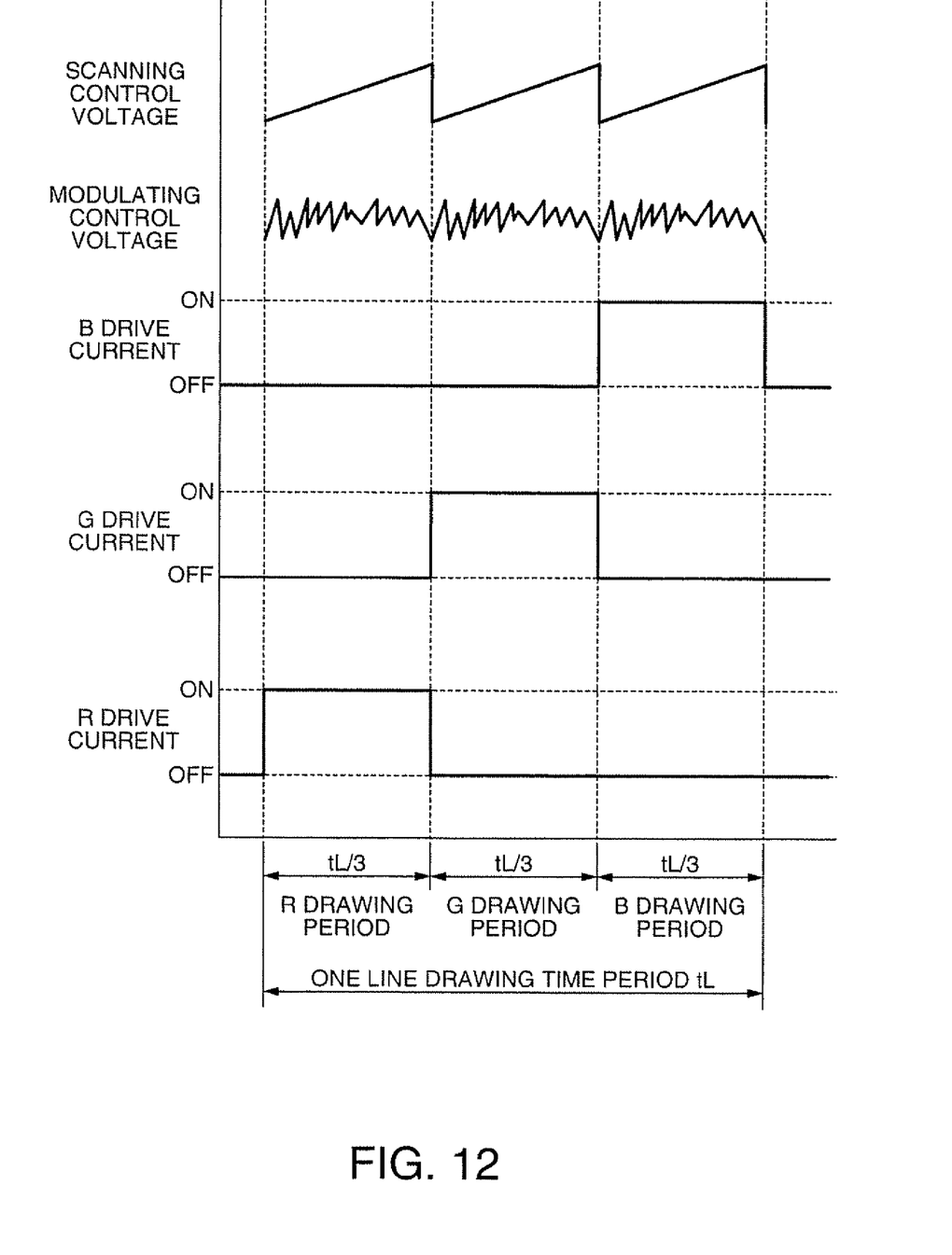
FIG. 12 is a timing chart of driving of a light source device and a voltage applied to an electro-optic element in the scanning optical device according to a fifth embodiment of the invention.

The control section 61 performs the color sequential drive on the red light source device 30R, the green light source device 30G, and the blue light source device 30B in this order so that the red laser beam, the green laser beam, and the blue laser beam are sequentially emitted in every line as shown in a timing chart of FIG. 12

In the case in which a line of three-color image is drawn with the red, green, and blue laser beams in a time period of tL, a drawing period of each laser beam every one line makes tL/3. Since each laser beam is modulated in the modulating area T1, only the ON/OFF control is required for each of the light source devices 30R, 30G, and 30B.

Firstly, the red light source device 30R is made operate by the control section 61, and one line of image is drawn with the red laser beam emitted from the red light source device 30R. Specifically, the red laser beam is rotated to have a predetermined polarization plane in the modulating area T1, and then input to the scanning area T2 to be deflected towards the scanning electrode 12b. Then, the laser beam deflected in the scanning area T2 is transmitted through the polarization plate 15 in accordance with the polarization plane, and then emitted therefrom. Further, during a period when the drawing by the red light source device 30R proceeds, the control section 61 controls the green light source device 30G and the blue light source device 30B to keep an OFF state.

After the drawing has been performed by the red light source device 30R, the green light source device 30G is made operate by the control section 61, and the drawing of the one line of image with the green laser beam is performed similarly to the case with the red laser beam. Further, during a period when the drawing by the green light source device 30G proceeds, the control section 61 controls the red light source device 30R and the blue light source device 30B to keep an OFF state.

Then, after the drawing has been performed by the green light source device 30G, the blue light source device 30B is made operate by the control section 61, and the drawing of the one line of image with the blue laser beam is performed similarly to the case with the red laser beam. Further, during a period when the drawing by the blue light source device 30B proceeds, the control section 61 controls the red light source device 30R and the green light source device 30G to keep an OFF state.

As described above, an appropriate display is obtained by overlapping the red, green, and blue laser beams every line on a human eye.

In the image display device 60 according to the present embodiment, the same advantage as in the image display device 50 according to the fourth embodiment can be obtained. Further, in the image display device 60 according to the present embodiment, since the red, green, and blue laser beams are scanned in a time sequential manner in a drawing period for one line so as to be overlapped with each other every line, the repeating frequency of the color becomes higher compared to the case of scanning the laser beams with different wavelengths every frame, thus occurrence of the color break-up can be suppressed. Further, since the driving speed of the galvanometer mirror 32, namely the vertical scanning rate of the screen 35, can be lowered compared to the case of scanning the laser beams with different wavelengths every frame, the slow galvanometer mirror 32 can also be adopted, thus cost reduction is possible.

It should be noted that the scope of the present invention is not limited to the embodiments described above, but various modifications can be executed thereon within the range of the scope or the spirit of the invention.

For example, although in each of the embodiments described above, the explanations have been made exemplifying the KTN crystal as the optical element, the optical element is not limited thereto, but can be any elements with refractive indexes varying linearly. For example, the optical element can be a dielectric crystal having an electro-optic effect such as lithium niobate ($LiNbO_3$). However, since the crystal having a component such as $LiNbO_3$ has a smaller scanning deflection angle and a higher drive voltage compared to the KTN crystal, it is preferable to use the KTN crystal.

Further, although as the colored light composition section, the cross dichroic prism is used, the colored light composition section is not limited thereto. As the colored light composition section, what has dichroic mirrors in a cross arrangement to combine the colored light beams, or what has dichroic mirrors arranged in parallel to each other to combine the colored light beams can be used.

The entire disclosure of Japanese Patent Application No. 2007-045120, filed Feb. 26, 2007 is expressly incorporated by reference herein.

What is claimed is:

1. An electro-optic element comprising:
  an electro-optic crystal having a birefringent property, and in which a refractive index distribution is generated in accordance with an intensity of an electric field caused inside;
  a pair of intensity modulating electrodes for applying a voltage for varying the birefringent property of the electro-optic crystal;
  a pair of scanning electrodes for applying a voltage for varying the refractive index distribution of the electro-optic crystal; and
  a polarization selection member provided at least on a side of a laser beam emission end face out of a laser beam entrance end face and the laser beam emission end face of the electro-optic crystal, and for selectively transmitting a part with a specific vibration direction out of a light beam emitted from the electro-optic crystal,
  wherein the electro-optic crystal comprising a modulating area between the intensity modulating electrodes and a scanning area between the scanning electrodes, the modulating area and the scanning area being sequentially disposed from the laser beam entrance end face along a proceeding direction of the laser beam with the modulating area being near the entrance end face.

2. The electro-optic element according to claim 1,
  wherein the intensity modulating electrodes and the scanning electrodes are different in material from each other.

3. The electro-optic element according to claim 1,
  wherein the electro-optic crystal includes a component of $KTa_{1-x}Nb_xO_3$.

4. A scanning optical device comprising:
  a light source device for emitting a laser beam; and
  the electro-optic element according to claim 1 which modulates the laser beam emitted from the light source device in accordance with an image signal, and scans the laser beam towards an irradiated surface.

5. The scanning optical device according to claim 4,
  wherein the light source device emits a plurality of laser beams with wavelengths different from each other, and
  the polarization selection member selectively transmits a part with a specific vibration direction out of the laser beam in a specific wavelength range out of wavelength ranges of the plurality of laser beams, and transmits the laser beams outside the specific wavelength range irrespective of vibration directions.

6. The scanning optical device according to claim 4,
  wherein the light source device emits a plurality of laser beams with wavelengths different from each other,
  the plurality of laser beams is respectively input to different areas of the electro-optic crystal, and
  the pair of intensity modulating electrodes is separately provided to each of the different areas.

7. The scanning optical device according to claim 4, wherein the light source device emits a plurality of laser beams with wavelengths different from each other, and there is provided a control section for controlling driving of the light source device so that the plurality of laser beams is scanned in a time sequential manner in a drawing period for one frame.

8. The scanning optical device according to claim 4, wherein the light source device emits a plurality of laser beams with wavelengths different from each other, and there is provided a control section for controlling driving of the light source device so that the plurality of laser beams is scanned in a time sequential manner in a drawing period for one line.

9. The scanning optical device according to claim 4, wherein the electro-optic element performs horizontal scanning.

* * * * *